(12) United States Patent
Yaso (10) Patent No.: US 11,450,483 B2
(45) Date of Patent: Sep. 20, 2022

(54) ELECTRONIC COMPONENT WITH BAKED ELECTRODES AND HAVING A CONTINUOUSLY CURVED RECESS

(71) Applicant: Murata Manufacturing Co., Ltd., Nagaokakyo (JP)

(72) Inventor: Toru Yaso, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 302 days.

(21) Appl. No.: 16/686,357

(22) Filed: Nov. 18, 2019

(65) Prior Publication Data

US 2020/0082986 A1    Mar. 12, 2020

Related U.S. Application Data

(63) Continuation of application No. PCT/JP2018/017636, filed on May 7, 2018.

(30) Foreign Application Priority Data

May 23, 2017  (JP) .............................. JP2017-101848

(51) Int. Cl.
  *H01G 4/252*    (2006.01)
  *H01G 4/30*     (2006.01)
  *H01F 27/29*    (2006.01)
  *H01F 41/04*    (2006.01)

(52) U.S. Cl.
  CPC ........... *H01G 4/252* (2013.01); *H01F 27/292* (2013.01); *H01F 41/04* (2013.01); *H01G 4/30* (2013.01)

(58) Field of Classification Search
  CPC ............ H01G 4/30; H01G 4/252; H01G 4/33; H01G 4/2325; H01G 4/232; H01G 4/224; H01F 27/292; H01F 41/04; H01F 2017/0026; H01F 17/0013; H01F 41/043
  See application file for complete search history.

(56) References Cited

U.S. PATENT DOCUMENTS 4,661,884 A * 4/1987 Seaman .................. H01G 4/30
                                                            29/25.42
9,056,442 B2   6/2015 Otsubo
9,230,719 B2   1/2016 Feichtinger et al.
(Continued)

FOREIGN PATENT DOCUMENTS

CN   103404241 A   11/2013
JP   S5992512 A    5/1984
(Continued)

OTHER PUBLICATIONS

International Search Report Issued in PCT/JP2018/017636, dated Jul. 17, 2018.
(Continued)

*Primary Examiner* — David M Sinclair
*Assistant Examiner* — Daniel M Dubuisson
(74) *Attorney, Agent, or Firm* — ArentFox Schiff LLP (57) ABSTRACT

An electronic component includes an electronic component main body having a mounting surface with first and second baked electrodes located thereon at locations spaced apart from one another. A recess extends into the electronic component main body in the area between the first and second baked electrodes. The recess extends over at least a part of at least one of the first and second baked electrodes.

9 Claims, 4 Drawing Sheets

(56) References Cited

U.S. PATENT DOCUMENTS

| | | | |
|---|---|---|---|
| 9,681,534 B2 | 6/2017 | Otsubo | |
| 2007/0203016 A1 | 8/2007 | Kojima et al. | |
| 2011/0235234 A1* | 9/2011 | Yamamoto | H01G 4/30 |
| | | | 361/321.1 |
| 2013/0330509 A1 | 12/2013 | Otsubo | |
| 2013/0341080 A1 | 12/2013 | Otsubo | |
| 2014/0160615 A1* | 6/2014 | Lee | H01G 4/232 |
| | | | 361/301.4 |
| 2014/0225710 A1 | 8/2014 | Feichtinger et al. | |
| 2018/0027658 A1* | 1/2018 | Choi | H05K 1/111 |
| | | | 174/260 |

FOREIGN PATENT DOCUMENTS

| | | | |
|---|---|---|---|
| JP | H06302406 A | * | 10/1994 |
| JP | H09260206 A | * | 10/1997 |
| JP | 2000124059 A | | 4/2000 |
| JP | 2001093770 A | | 4/2001 |
| JP | 2007048844 A | * | 2/2007 |
| JP | 4016806 B | | 12/2007 |
| JP | 2014524154 A | | 9/2014 |
| TW | 200741769 A | | 11/2007 |
| WO | 2012121141 A1 | | 9/2012 |
| WO | 2012132880 A1 | | 10/2012 |

OTHER PUBLICATIONS

Written Opinion of the International Searching Authority issued in PCT/JP2018/017636, dated Jul. 17, 2018.

* cited by examiner

ELECTRONIC COMPONENT WITH BAKED ELECTRODES AND HAVING A CONTINUOUSLY CURVED RECESS

CROSS REFERENCE TO RELATED APPLICATIONS

The present application is a continuation of International application No. PCT/JP2018/017636, filed May 7, 2018, which claims priority to Japanese Patent Application No. 2017-101848, filed May 23, 2017, the entire contents of each of which are incorporated herein by reference.

TECHNICAL FIELD

The present invention relates to an electronic component and a method for manufacturing the electronic component.

BACKGROUND ART

As an electronic component in which a terminal electrode is provided on a surface of, for example, an electronic component main body, for example, a chip component or the like to be mounted in or on a substrate such as a multilayer ceramic substrate or the like may be used. The terminal electrode is used for connection with other electronic components such as a multilayer ceramic substrate.

For example, Japanese Unexamined Patent Application Publication No. 2000-124059 discloses a structure in which a surface-mounted electronic component including a terminal electrode is mounted on a substrate electrode using a conductive adhesive. The terminal electrode is made of a single electrode material and is formed by firing a paste material containing an Ag—Pd alloy.

In recent years, with the reduction in size and height and multi-terminal arrangement of electronic components such as multilayer ceramic capacitors and the like, a bonding area between a baked electrode (formed by baking a conductive paste) and an electronic component main body is reduced. Therefore, when a load is applied to the electronic component from the side, there is a risk that the bonding surface between the baked electrode and the electronic component main body may be peeled off.

The present invention has been made to solve or at least reduce these problems. It is therefore an object of the present invention to provide an electronic component in which the fixing force between a baked electrode and an electronic component main body is improved and peeling of the baked electrode from the electronic component main body due to the application of an external force can be suppressed. It is another object of the present invention to provide a method for manufacturing the above electronic component.

SUMMARY OF THE INVENTION

According to one aspect of the present invention, an electronic component includes an electronic component main body having a mounting surface. First and second baked electrodes are located at spaced locations on the mounting surface. A recess extends into the electronic component main body in the area between the first and second baked electrodes and over at least a part of at least one of the first and second baked electrodes. In a preferred embodiment, the recess extends over at least part of both the first and second baked electrodes.

In another aspect of the invention, a ceramic layer is located in the recess and extends over at least a part of at least one of the first and second electrodes in an area where the recess extends.

In another aspect of the invention, first and second plating electrodes are provided on the first and second baked electrode, respectively, and at least one of the first and second plating electrodes covers a part of the ceramic layer.

The recess has an outer periphery and, in some embodiments, the thickness of the ceramic layer is reduced toward the outer periphery.

The recess also has an inner portion located inwardly of the outer periphery and the thickness of the first and second baked electrodes are thinner in the inner portion than at the outer periphery.

In some embodiments, the electronic component main body includes a passive element portion including at least two internal electrode layers laminated together between a dielectric layer. The passive element portion is preferably located below the recess in a plan view as viewed from the mounting surface side.

In some embodiments the mounting surface is planar and the first and second baked electrodes are recessed into the planar mounting surface. In a preferred embodiment outer surfaces of the first and second baked electrodes are coplanar with the mounting surface and the recess extends through a portion of each of the first and second baked electrodes and into the electronic component main body.

A method for manufacturing an electronic component according to one aspect of the invention comprises:

forming first and second conductive paste layers at spaced locations on a surface of an unfired electronic component main body;

forming a resin paste layer over a portion of the surface of the unfired component main body extending between the first and second conductive paste layers with the resin paste layer extending over at least part of at least one of the first and second conductive past layers, whereby an unfired layered composite including the unfired electronic component main body, the first and second conductive paste layers and the resin paste layer is formed;

flattened the first and second conductive paste layers and the resin paste layers by pressure bonding to form a flat upper surface; and firing the unfired layered composite to form a fired electronic component main body having a mounting surface with fired first and second baked electrodes thereon, the firing burning off the resin paste layer and leaving a recess extending into the fired electronic component main body in the area between the first and second baked electrodes, the recess extending over at least a part of at least one of the first and second baked electrodes.

In another aspect of the invention, the method further comprises, before forming the resin paste layer, forming a ceramic paste layer which covers the portion of the surface of the unfired electronic component main body extending between first and second conductive paste layers and at least a part of at least one of the first and second conductive paste layers and thereafter forming the resin paste so as to cover at least a part of the ceramic paste layer.

In preferred embodiments of the invention a surface of the unfired layered composite is barrel polished before the unfired layered composite is fired.

According to the present invention, it is possible to provide an electronic component which has an improved fixing force between a baked electrode and an electronic component main body, and can suppress peeling of the baked electrode from the electronic component main body due to an external force.

DETAILED DESCRIPTION OF THE PREFERRED EMBODIMENTS

Hereinafter, exemplary embodiments of an electronic component according to the present invention will be described. However, the present invention is not limited to the following configurations, and may be appropriately modified without departing from the spirit and scope of the present invention. It is to be noted that some or all of the features of the various disclosed embodiments can be combined, as desired.

The embodiments shown below are examples only, and that partial replacement or combination of the configurations shown in different embodiments is possible. A first embodiment (including variations thereon) is described first. In the description of the second embodiment, descriptions of items common to those in a first embodiment will be omitted, and only differences between the two embodiments will be described. Without limitation, similar operation and effects with the same configuration will not be described in order for each embodiment.

In the following embodiments, a case where the electronic components of the present invention are mounted in or on a substrate such as a multilayer ceramic substrate will be described. Examples of the chip component include a multilayer ceramic electronic component, for example, an LC composite component such as a multilayer filter or the like, a multilayer ceramic capacitor, and a multilayer inductor. Further, the chip components may be various ceramic electronic components other than the multilayer ceramic electronic component. The electronic component of the present invention is not limited to a chip component, and may be a substrate such as a multilayer ceramic substrate.

First Embodiment

Figure 1:
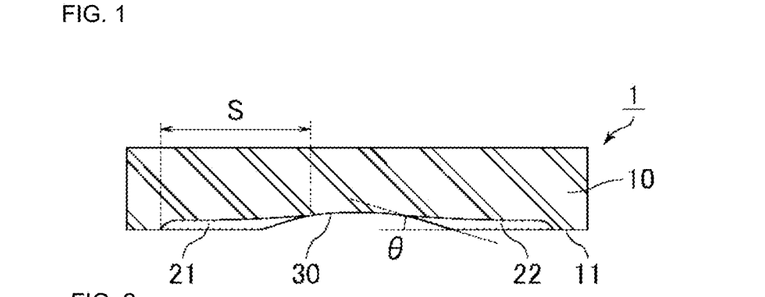
FIG. 1 is a cross-sectional view, taken along lines I-I of FIG. 2, schematically illustrating an example of an electronic component according to a first embodiment of the present invention.
Figure 2:
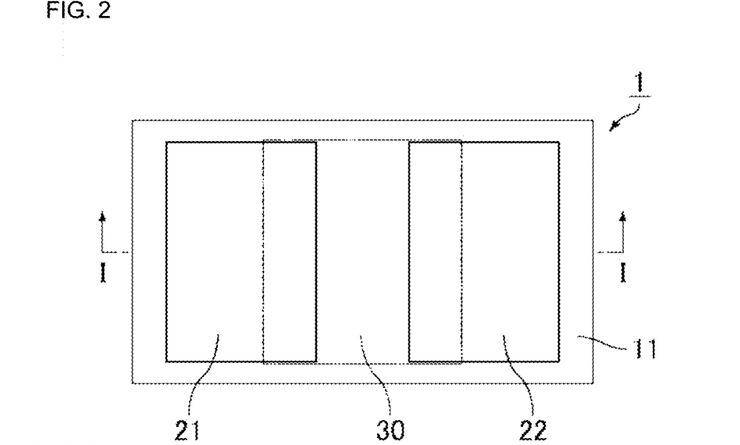
FIG. 2 is a bottom plan view of the electronic component illustrated in FIG. 1 as viewed from a mounting surface side of the electronic component.

Referring now to the drawings wherein like numerals indicate like elements, FIGS. 1 and 2 illustrate an electronic component 1 that includes an electronic component main body 10 having a mounting surface 11 on which first and second baked electrodes 21 and 22 are located. The first and second baked electrodes 21 and 22 are spaced apart from each other in the horizontal direction as viewed in FIG. 1. [In the present specification, the term "baked electrode" refers to an electrode formed by baking a conductive paste.]

A recess 30 is formed between the first and second baked electrodes 21 and 22. The recess 30 extends inwardly (upwardly as viewed in FIG. 1) toward the inside of the electronic component main body 10 and preferably overlaps at least a portion of the first and second baked electrodes 21 and 22 in a plan view as viewed from below the mounting surface 11 as viewed in FIG. 1. In other words, at least a part of the first baked electrode 21 and/or the second baked electrode 22 are located in the recess 30. Further, portions of the first and second baked electrodes 21 and 22 that are located in the recess 30 are recessed toward the inside of the electronic component main body 10 (i.e., upwardly as viewed in FIG. 1). With this structure, the first baked electrode is fixed to the electronic component main body 11 along a fixing area whose width is indicated by a double-headed arrow S.

Figure 3:
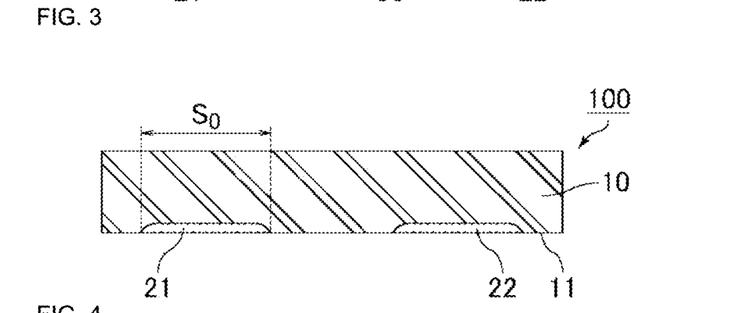
FIG. 3 is a cross-sectional view schematically illustrating an example of an existing electronic component.

FIG. 3 is a cross-sectional view schematically illustrating an example of an existing electronic component. As shown therein, the electronic component 100 has no recess is formed between the first and second baked electrodes 21 and 22. The size of the fixing area (as measured in the horizontal direction of FIG. 3) between the first baked electrode 21 and the electronic component main body 10 is indicated by a double-headed arrow S0.

Because a recess is formed between two baked electrodes of the electronic component main body and at least a part of at least one of the baked electrodes is located in the recess, it is possible to increase the fixing area between the baked electrode and the electronic component main body in comparison with the existing electronic component in which the recess is not formed. The fixing area between the baked electrode and the electronic component main body is increased because 'S' is larger than 'S0' as shown in FIGS. 1 and 3. Therefore, it is possible to suppress peeling of the baked electrode from the electronic component main body due to an external force.

In addition, when the electronic component of the present invention is mounted on or in a substrate, since the recess is formed on the mounting surface of the electronic component main body, the electronic component main body becomes less likely to project toward the substrate side than does the baked electrode (that is, the baked electrode is more likely to project toward the substrate on which the electronic component is mounted than the electronic main body itself). If the electronic component main body was to project toward the substrate on which the electronic component is to be mounted more that the baked electrode, a force will be locally generated at the time of mounting, and there is a risk that the electronic component may be cracked. Because the electronic component of the present embodiment includes at least a part of baked electrode which overlaps a recess, the electronic component main body is less likely to project on toward the substrate on which the electronic component is to be mounted relative to the baked electrode, it is possible to suppress cracks of such an electronic component.

In the electronic component according to the first embodiment of the present invention, the first baked electrode and the second baked electrode preferably contain a conductive component. In order to increase the bonding strength between the baked electrodes and the electronic component main body, it is preferable that the first and second baked electrodes contain a ceramic material and/or a glass material.

Examples of the conductive component contained in the first and second baked electrodes include, for example, Cu, Ag, Au, Pt, Ta, W, Ni, Fe, Cr, Mo, Ti, Pd, Ru, an alloy containing one of these metals as a main component. The first and second baked electrodes preferably contain Cu, Ag or Au as a conductive component, and more preferably Cu or Ag.

In the electronic component according to the first embodiment of the present invention, the shape, arrangement, and the like of the first and second baked electrodes are not particularly limited as long as they are provided on the mounting surface of the electronic component main body so that a part of the first and/or second baked electrodes are located within the recess.

In the electronic component according to the first embodiment of the present invention, although a thickness of the first and second baked electrodes are not particularly limited, it is preferable that the thickness become thinner toward the middle of the recess as viewed in FIG. 1. When an end portion of the baked electrode is thin it less likely to become a starting point of a crack compared with a case where the end portion of the baked electrode has an angular shape, so that the baked electrode is less likely to be peeled off from the electronic component main body. A baked electrode having such a shape is preferably obtained by performing printing on an electronic component main body by a method such as screen printing using a conductive paste.

Figure 4:
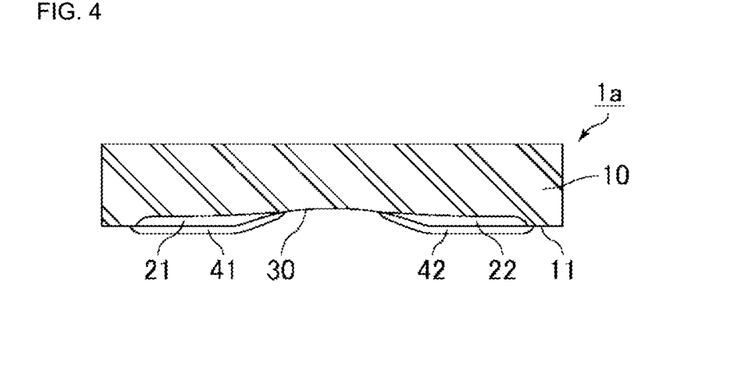
FIG. 4 is a cross-sectional view schematically illustrating another example of the electronic component according to the first embodiment of the present invention.

FIG. 4 is a cross-sectional view schematically illustrating another example of the electronic component according to the first embodiment of the present invention. In this variation, first and second plating electrodes 41 and 42 are provided on upper surfaces of the first and second baked electrodes 21 and 22, respectively. [In the present specification, the term "plating electrode" refers to an electrode formed by performing electroplating or electroless plating after forming a baked electrode.]

A part of the first plating electrode 41 and a part of the second plating electrode 42 are preferably located in the recess 30. As a result, those portions of the first and second plating electrodes 41 and 42 are recessed toward the inside of the electronic component main body 10 (upwardly as viewed in FIG. 4).

As discussed above, in the electronic component according to the first embodiment of the present invention, the shape, arrangement, thickness, and the like of the first plating electrode and the second plating electrode are not particularly limited.

The baked electrode and the plating electrode provided on the surface of the electronic component main body function as terminal electrodes for connection with other electronic components such as a multilayer ceramic substrate. The terminal electrode and the other electronic component are connected to each other by, for example, a conductive adhesive, soldering, or the like.

In the electronic component according to the first embodiment of the present invention, although the shape of the recess is not particularly limited, it is preferable to have a shape that deepens from an outer side portion of the recess toward the inside as the recess 30 illustrated in FIG. 1. The recess may be provided with a region having a constant depth.

In the electronic component according to the first embodiment of the present invention, although the maximum depth of the recess is not particularly limited, it is preferably equal to or more than 5 μm and equal to or less than 50 μm. By making the recess deeper, the angle can be added to the baked electrode in the recess, so that the fixing force between the baked electrode and the electronic component main body can be increased. The reason why the fixing force between the baked electrode and the electronic component main body can be increased is that a contact area between the baked electrode and the electronic component main body is increased.

In addition, in the left-right (i.e., horizontal) direction in FIG. 1, the depth of the recess may be constant or may vary. In addition, the depth of the recess as viewed in FIG. 2 may be constant or may vary along the vertical direction (i.e., as one moves from the bottom to the top of the sheet on which FIG. 2 is drawn).

In the electronic component according to the first embodiment of the present invention, it is preferable that a ratio of the maximum depth of the recess with respect to the thickness of the electronic component be equal to or more than 1/60 and equal to or less than 1/4. The thickness of the electronic component means the maximum thickness of a portion without the recess, and is about 300 μm, for example.

In the electronic component according to the first embodiment of the present invention, although an angle (angle indicated by θ in FIG. 1) of the baked electrode is not particularly limited, it is preferably equal to or more than 5 degrees and equal to or less than 60 degrees from the viewpoint of increasing the fixing force between the baked electrode and the electronic component main body.

In the electronic component according to the first embodiment of the present invention, although the width of the recess is not particularly limited, it is preferably equal to or more than 50 μm. The width of the recess is, for example, equal to or less than 200 μm. The width of the recess may be constant or may vary along the horizontal direction as viewed in FIG. 2 and/or the vertical direction of FIG. 2.

Figure 5A:
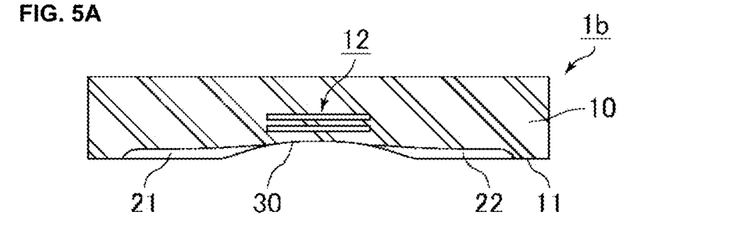
FIG. 5A is a cross-sectional view schematically illustrating another example of the electronic component according to the first embodiment of the present invention.

FIG. 5A is a cross-sectional view schematically illustrating yet another example of the electronic component according to the first embodiment of the present invention.

In an electronic component 1b illustrated in FIG. 5A, the electronic component main body 10 has a passive element portion 12 under the recess 30 (above the recess as viewed in FIG. 5A. In FIG. 5A, the passive element portion 12 is illustrated in a simplified form, and a capacitor (capacitance portion) including a plurality of internal electrode layers laminated with a dielectric layer sandwiched there between is illustrated.

Figure 5B:
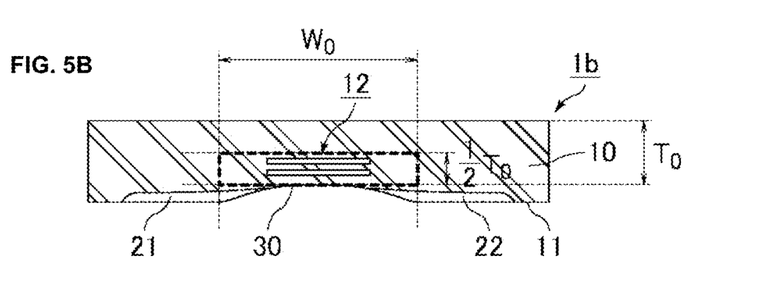
FIG. 5B is a diagram for explaining a lower portion of the recess of FIG. 5A.

In this specification, the lower portion of the recess refers to a region inward in a width direction of the recess (range indicated by W0 in FIG. 5B) and toward an opposite side in a thickness direction from the deepest portion of the recess (range indicated by T0 in FIG. 5B). In particular, as illustrated in FIG. 5B, it is preferable that the lower portion of the recess be a region up to ½ of a height obtained by subtracting the maximum depth of the recess from the thickness of the electronic component (range indicated by ½ T0 in FIG. 5B). When this is done, the electronic component can be thinner.

In the electronic component according to the first embodiment of the present invention, although a structure of the electronic component main body is not particularly limited, it is preferable, as illustrated in FIG. 5A and FIG. 5B, that the electronic component main body include a passive element portion including a plurality of internal electrode layers laminated with the dielectric layer sandwiched therebetween under the recess in a plan view as viewed from the mounting surface side of the electronic component. Examples of the passive element portion include a capacitor (capacitance portion) and an inductor (coil).

When the electronic component is manufactured by the method described below, since the electronic component main body is pressed toward the inside to form the recess, a distance in the thickness direction between the internal electrode layers of the passive element portion is narrowed. As a result, compared with a case where no recess is formed, for example, capacitance per unit area can be increased in the capacitor (capacitance portion), and an L value per unit area can be increased in the inductor (coil), so that the characteristics of the electronic component can be improved.

In the electronic component according to the first embodiment of the present invention, a via electrode (not shown in the drawings) to be connected to the baked electrode provided on the mounting surface may be provided at the inside of the electronic component main body.

The electronic component according to the first embodiment of the present invention is preferably manufactured as follows.

A method for manufacturing the electronic component according to the first embodiment of the present invention includes forming a first conductive paste layer to be a first baked electrode and a second conductive paste layer to be a second baked electrode spaced apart from the first conductive paste layer by applying a conductive paste to a surface to be a mounting surface in an unfired electronic component main body, forming a resin paste layer by applying a resin paste so as to cover a part of the first conductive paste layer and a part of the second conductive paste layer, between the first conductive paste layer and the second conductive paste layer, obtaining an unfired layered composite in which the mounting surface is flattened, by pressure-bonding the unfired electronic component main body in which the first conductive paste layer, the second conductive paste layer, and the resin paste layer are formed on the mounting surface, and firing the unfired layered composite, in which the resin paste layer is burned off in firing the unfired layered composite, whereby a recess recessed toward an inside of the electronic component main body is formed so as to overlap a part of the first baked electrode and a part of the second baked electrode, between the first baked electrode and the second baked electrode in a plan view as viewed from the mounting surface side.

In the foregoing method, first and second conductive paste layers are formed on the surface of the unfired electronic component main body which is to be the mounting surface of the electronic component, and a resin paste layer is formed in the area between the first and second conductive paste layers and on a part of the first and second conductive paste layers. Then, these unfired components are pressure-bonded to obtain the unfired layered composite in which the mounting surface is flattened. In the unfired layered composite, since the mounting surface including the resin paste layer is flat, the recess can be formed in a portion where the resin sheet layer has been present by burning off the resin paste layer. As a result, it is possible to manufacture an electronic component having a large fixing force between the baked electrode and the electronic component main body.

The method for manufacturing the electronic component according to the first embodiment of the present invention preferably further includes barrel-polishing the surface of the unfired layered composite before firing the unfired layered composite.

In a case where the barrel-polishing is performed during firing, when the first conductive paste layer and the second conductive paste layer are exposed to the mounting surface, there is a risk that these conductive paste layers are peeled off by barrel-polishing. In contrast, in the method for manufacturing the electronic component according to the first embodiment of the present invention, since a part of the first conductive paste layer and a part of the second conductive paste layer are covered with the resin sheet layer during barrel-polishing, peeling of the conductive paste layer due to the barrel-polishing can be suppressed.

An exemplary method for manufacturing an LC filter will be described below as an example of the method for manufacturing the electronic component according to the first embodiment of the present invention.

First, a plurality of ceramic green sheets are prepared. At least one of the ceramic green sheets serves as a dielectric layer after firing.

The ceramic green sheets are formed by forming a slurry containing, for example, ceramic powder, an organic binder, and a solvent into a sheet by a doctor blade method or the like. The above-described slurry may contain various additives such as a dispersing agent and a plasticizer.

A hole for forming a via electrode is formed in a specific ceramic green sheet. The hole may be formed by, for example, laser processing or the like.

Figure 6A:
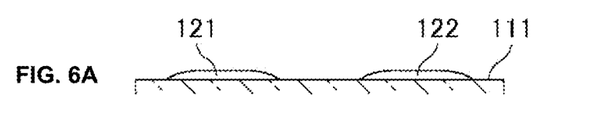
FIGS. 6A, 6B, 6C, 6D, and 6E are cross-sectional views schematically illustrating an exemplary method for manufacturing an electronic component according to the first embodiment of the present invention.

As illustrated in FIG. 6A, a conductive paste is applied, in a desired shape, to a mounting surface 111 of the substrate defined by the outermost ceramic green sheet, thereby forming a first and second conductive paste layers 121 and 122. The first and second conductive paste layers 121 and 122 are spaced apart from each other as shown in FIG. 6A and can be formed by a method such as screen printing by using a conductive paste containing, for example, Cu or Ag as a conductive component. The above-described conductive paste may contain a ceramic material and/or a glass material. The first conductive paste layer 121 and the second conductive paste layer 122 may be formed by a method such as photolithography instead of the screen printing. The first conductive paste layer 121 and the second conductive paste layer 122 may be formed after the ceramic green sheet is laminated.

Figure 6B:
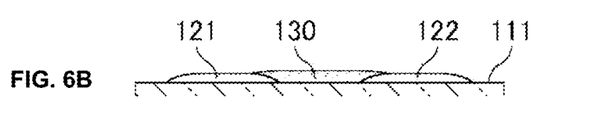

Next, as illustrated in FIG. 6B, a resin paste layer 130 is formed so as to extend between and onto a portion of the first and second conductive paste layers 121 and 122 by applying a resin paste. The resin paste layer 130 can be formed by a method such as the screen printing by using a resin material such as a cross-linked acrylic resin and a resin paste containing an organic vehicle or the like. The resin paste may be applied in a desired shape in accordance with a shape in which the electronic component main body is recessed.

Separately, a conductive paste is applied, in a desired shape, to a surface of a specific ceramic green sheet to form a conductive paste layer to be an internal electrode layer. The conductive paste layer to be the internal electrode layer can be formed by a method such as the screen printing by using a conductive paste containing, for example, Cu or Ag as a conductive component. Further, by filling the hole for forming the via electrode with the above-described conductive paste, a conductive paste body to be the via electrode is formed. As described above, it is possible to form electrodes of, such as a coil a capacitance and the like, which constitute the LC filter.

Figure 6C:
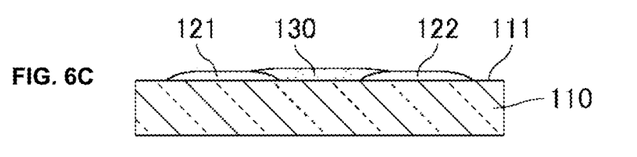

Subsequently, by laminating a plurality of ceramic green sheets, as illustrated in FIG. 6C, an unfired electronic component main body 110 in which the first conductive paste layer 121, the second conductive paste layer 122, and the resin paste layer 130 are formed on the mounting surface 111 is obtained. The portion of the main body 10 shown in FIGS. 6A and 6B is a single ceramic layer. Subsequent ceramic layers are added after the conductive and resin paste layers are applied to form the main body 10.

Figure 6D:
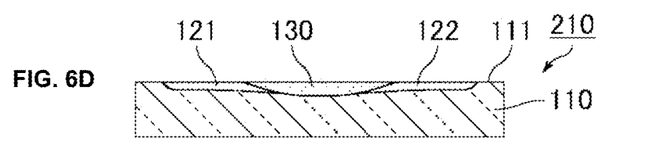

The resulting unfired electronic component main body 110 is pressure-bonded at a temperature of, for example, equal to or higher than 50° C. and equal to or lower than 80° C., and at a pressure of equal to or more than 800 MPa and equal to or less than 1400 MPa, thereby obtaining an unfired layered composite 210 in which the mounting surface 111 is flattened, as illustrated in FIG. 6D. In the unfired layered composite 210, the first conductive paste layer 121, the second conductive paste layer 122, and the resin paste layer 130 are buried.

If necessary, the unfired layered composite may be cut and thereby divided into individual chips by using a dicer, a microcutter or the like.

As described above, it is preferable to barrel-polish the surface of the unfired layered composite before firing. In this case, the unfired layered composite is encapsulated with a media ball having a hardness higher than that of the dielectric layer in a small box called a barrel, and the barrel is rotated to perform polishing. By barrel-polishing, edge portions and ridge portions of the unfired layered composite are rounded.

Figure 6E:
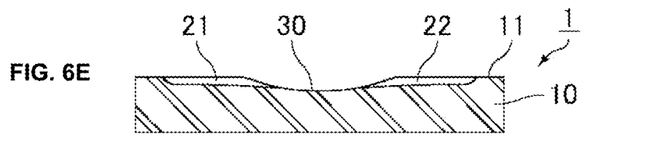

Thereafter, the unfired layered composite is fired. With this, as illustrated in FIG. 6E, the electronic component 1 including the electronic component main body 10, the first baked electrode 21 provided on the mounting surface 11 of the electronic component main body 10, and the second baked electrode 22 provided on the mounting surface 11 of the electronic component main body 10 spaced apart from the first baked electrode 21 is obtained.

During firing, the resin paste layer is burned off creating the recess 30.

Although a firing temperature is not particularly limited, it is preferably equal to or higher than 800° C. and equal to or lower than 1000° C., for example.

The firing atmosphere is not particularly limited, and examples thereof include a nitrogen atmosphere and the like. However, in a case where an electrode material is not oxidized, the firing atmosphere may be an atmospheric air.

A plating electrode may be formed on the upper surface of the baked electrode by performing electroplating or electroless plating to the electronic component after firing.

Second Embodiment

In a second embodiment of the present invention, similarly to the first embodiment of the present invention, a recess is formed between the first baked electrode and the second baked electrode, the recess is formed to be recessed toward the inside of the electronic component main body so as to overlap a part of the first baked electrode and a part of the second baked electrode in a plan view as viewed from the side of the mounting surface.

Furthermore, in the second embodiment of the present invention, a ceramic layer is provided in the recess, which is recessed toward the inside of the electronic component main body and which covers at least a part of the first baked electrode on the recess and at least a part of the second baked electrode on the recess.

Figure 7:
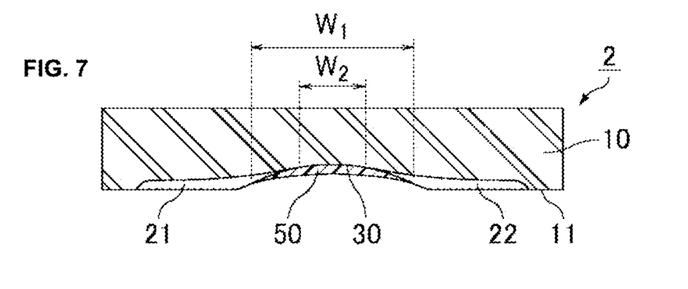
FIG. 7 is a cross-sectional view schematically illustrating an example of an electronic component according to a second embodiment of the present invention.

As illustrated in FIG. 7, an electronic component 2 of the second embodiment includes the electronic component main body 10 having the mounting surface 11, the first baked electrode 21, and the second baked electrode 22. The first baked electrode 21 and the second baked electrode 22 are provided so as to be spaced apart from each other on the mounting surface 11 of the electronic component main body 10.

As illustrated in FIG. 7, between the first baked electrode 21 and the second baked electrode 22, the recess 30 recessed toward the inside of the electronic component main body 10 is formed so as to overlap a part of the first baked electrode 21 and a part of the second baked electrode 22 in a plan view as viewed from the side of the mounting surface 11. In other words, a part of the first baked electrode 21 and a part of the second baked electrode 22 are located in the recess 30. Further, the first baked electrode 21 and the second baked electrode 22 in the recess 30 are recessed toward the inside of the electronic component main body 10.

The electronic component 2 illustrated in FIG. 7 further includes a ceramic layer 50 provided in the recess 30. The ceramic layer 50 is recessed toward the inside of the electronic component main body 10, and covers at least a part of the first baked electrode 21 on the recess 30 and at least a part of the second baked electrode 22 on the recess 30.

In the electronic component according to the second embodiment of the present invention, the ceramic layer is provided in the recess, and the ceramic layer is recessed toward the inside of the electronic component main body and covers at least a part of the first baked electrode on the recess and at least a part of the second baked electrode on the recess. Thus, it is possible to set a distance between exposed surfaces of two baked electrodes (a length indicated by a double-headed arrow W1 in FIG. 7) to be longer than a distance between the baked electrodes (a length indicated by a double-headed arrow W2 in FIG. 7). Therefore, a bridge between the baked electrodes can be suppressed.

In the electronic component according to the second embodiment of the present invention, the ceramic layer may cover the entire of the first baked electrode on the recess, or may cover a part of the first baked electrode on the recess. Similarly, the ceramic layer may cover the entire of the second baked electrode on the recess, or may cover a part of the second baked electrode on the recess. A range in which the ceramic layer covers the first baked electrode on the recess may be the same as or may be different from a range in which the ceramic layer covers the second baked electrode on the recess.

In the electronic component according to the second embodiment of the present invention, as a ceramic material constituting the ceramic layer, for example, a ceramic material which is the same as the ceramic material contained in the ceramic green sheet for manufacturing the electronic component main body can be used. Further, the ceramic material constituting the ceramic layer may be a metal oxide such as alumina.

In the electronic component according to the second embodiment of the present invention, although a thickness of the ceramic layer is not particularly limited, it is preferable that the thickness become thinner toward the outer side portion of the recess as illustrated in FIG. 7. When an end portion of the ceramic layer is thin, the end portion of the ceramic layer is little likely to become a starting point of a crack as compared with a case where the end portion of the ceramic layer has an angular shape, so that the ceramic layer is hardly peeled off from the baked electrode. The ceramic layer having such a shape is obtained by printing on the electronic component main body by a method such as screen printing using a ceramic paste.

In the electronic component according to the second embodiment of the present invention, the configurations of the first baked electrode and the second baked electrode are the same as those of the first embodiment of the present invention.

In the electronic component according to the second embodiment of the present invention, although the thickness of the first baked electrode and the thickness of the second baked electrode are not particularly limited, it is preferable that the thickness become thinner toward the inside of the recess as illustrated in FIG. 7.

Figure 8:
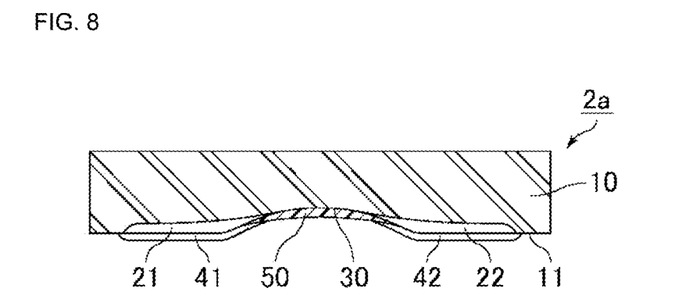
FIG. 8 is a cross-sectional view schematically illustrating another example of the electronic component according to the second embodiment of the present invention.

FIG. 8 is a cross-sectional view schematically illustrating another example of the electronic component according to the second embodiment of the present invention.

In an electronic component 2a illustrated in FIG. 8, the first plating electrode 41 is provided on the upper surface of the first baked electrode 21, and the second plating electrode 42 is provided on the upper surface of the second baked electrode 22. A part of the first plating electrode 41 and a part of the second plating electrode 42 are located in the recess 30. Moreover, the first plating electrode 41 and the second plating electrode 42 in the recess 30 are recessed toward the inside of the electronic component main body 10. Further, the first plating electrode 41 and the second plating electrode 42 cover a part of the ceramic layer 50.

As illustrated in FIG. 8, the electronic component according to the second embodiment of the present invention preferably further includes the first plating electrode provided on the upper surface of the first baked electrode, and the second plating electrode provided on the upper surface of the second baked electrode. In this case, it is preferable that either one of the first plating electrode or the second plating electrode cover a part of the ceramic layer, and more preferable that both of the first plating electrode and the second plating electrode cover a part of the ceramic layer. The plating electrode covers a part of the ceramic layer, so that the ceramic layer becomes less likely to be peeled off from the baked electrode.

In the electronic component according to the second embodiment of the present invention, shapes and thicknesses of the first plating electrode and the second plating electrode are not particularly limited.

In the electronic component according to the second embodiment of the present invention, the configuration of the recess is the same as that of the first embodiment of the present invention. A preferred maximum depth of the recess, a preferred ratio of the maximum depth of the recess with respect to the thickness of the electronic component, a preferred angle of the baked electrode, and a preferred width of the recess are also the same as those of the first embodiment of the present invention.

In the electronic component according to the second embodiment of the present invention, although the configuration of the electronic component main body is not particularly limited, similar to the first embodiment of the present invention, it is preferable that the electronic component main body include the passive element portion including the plurality of internal electrode layers which are laminated with the dielectric layer sandwiched therebetween under the recess in a plan view as viewed from the mounting surface side.

In the electronic component according to the second embodiment of the present invention, the via electrode to be connected to the baked electrode provided on the mounting surface may be provided at the inside of the electronic component main body.

The electronic component according to the second embodiment of the present invention is preferably manufactured as follows.

The method for manufacturing the electronic component according to the second embodiment of the present invention further includes forming a ceramic paste layer by applying a ceramic paste so as to cover a part of the first conductive paste layer and a part of the second conductive paste layer, between the first conductive paste layer and the second conductive paste layer, after forming the first conductive paste layer and the second conductive paste layer, and the resin paste is applies so as to cover at least a part of the ceramic paste layer in forming the resin paste layer. The other processes are the same as those of the first embodiment of the present invention.

By the above method, the ceramic layer can be formed and the recess can also be formed.

The method of manufacturing the electronic component according to the second embodiment of the present invention preferably further includes barrel-polishing the surface of the unfired layered composite before firing the unfired layered composite.

FIG. 9A, FIG. 9B, FIG. 9C, FIG. 9D, FIG. 9E, and FIG. 9F are cross-sectional views schematically illustrating an example of the method for manufacturing the electronic component according to the second embodiment of the present invention.

Figure 9A:
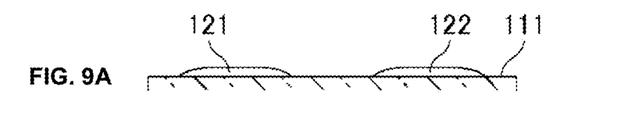
FIGS. 9A, 9B, 9C, 9D, 9E, and 9F are cross-sectional views schematically illustrating an example of a method for manufacturing the electronic component according to the second embodiment of the present invention.

Similar to the first embodiment of the present invention, as illustrated in FIG. 9A, the conductive paste is applied, in a desired shape, to the surface to be the mounting surface 111, that is, the surface of the ceramic green sheet arranged on the surface after lamination, in the unfired electronic component main body, thereby forming the first conductive paste layer 121 to be the first baked electrode and the second conductive paste layer 122 to be the second baked electrode. The first conductive paste layer 121 and the second conductive paste layer 122 may be formed after the ceramic green sheet is laminated.

Figure 9B:
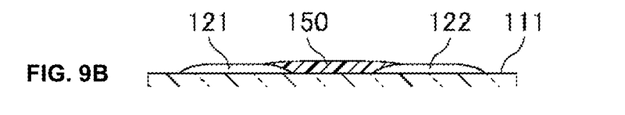

Next, as illustrated in FIG. 9B, a ceramic paste layer 150 is formed between the first conductive paste layer 121 and the second conductive paste layer 122 by applying a ceramic paste so as to cover a part of the first conductive paste layer 121 and a part of the second conductive paste layer 122. The ceramic paste layer 150 can be formed by a method such as screen printing using, for example, ceramic materials contained in the ceramic green sheet for manufacturing the electronic component main body and a ceramic paste containing an organic vehicle and the like. Instead of the ceramic material contained in the ceramic green sheet for manufacturing the electronic component main body, a metal oxide such as alumina may be used.

Figure 9C:
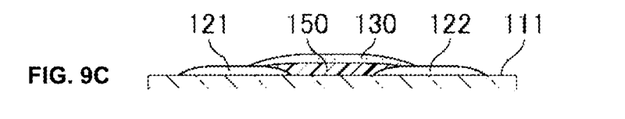

Subsequently, as illustrated in FIG. 9C, the resin paste layer 130 is formed by applying a resin paste so as to cover at least a part of the ceramic paste layer 150. The resin paste may be applied in a desired shape in accordance with a shape in which the electronic component main body is recessed. As illustrated in FIG. 9C, the resin paste layer 130 may cover a part of the first conductive paste layer 121 and a part of the second conductive paste layer 122 which are not covered with the ceramic paste layer 150.

Figure 9D:
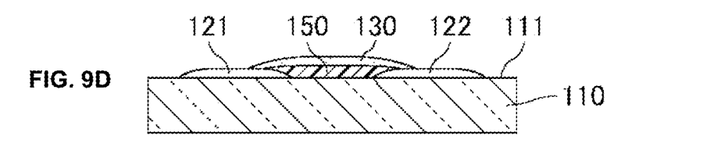

Similar to the first embodiment of the present invention, by laminating the plurality of ceramic green sheets, as illustrated in FIG. 9D, the unfired electronic component main body 110 in which the first conductive paste layer 121, the second conductive paste layer 122, the ceramic paste layer 150, and the resin paste layer 130 are formed on the mounting surface 111 is obtained.

Figure 9E:
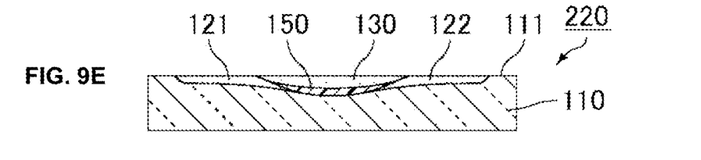

By pressure-bonding the obtained unfired electronic component main body 110, an unfired layered composite 220 in which the mounting surface 111 is flattened is obtained as illustrated in FIG. 9E. In the unfired layered composite 220, the first conductive paste layer 121, the second conductive paste layer 122, the ceramic paste layer 150, and the resin paste layer 130 are buried.

If necessary, the unfired layered composite may be cut and thereby divided into individual chips by using a dicer, a microcutter or the like.

As described above, it is preferable to barrel-polish the surface of the unfired layered composite before firing. By barrel-polishing, edge portions and ridge portions of the unfired layered composite are rounded.

Thereafter, similar to the first embodiment of the present invention, the unfired layered composite is fired.

Figure 9F:
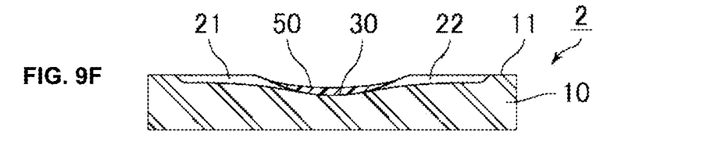

With this, as illustrated in FIG. 9F, the electronic component 2 including the electronic component main body 10, the first baked electrode 21 provided on the mounting surface 11 of the electronic component main body 10, the second baked electrode 22 provided on the mounting surface 11 of the electronic component main body 10 spaced apart from the first baked electrode 21, and the ceramic layer 50 is obtained.

The resin paste layer is burned off by heat at the time of firing. As a result, as illustrated in FIG. 9F, between the first baked electrode 21 and the second baked electrode 22, the recess 30 recessed toward the inside of the electronic component main body 10 is formed so as to overlap a part of the first baked electrode 21 and a part of the second baked electrode 22 in a plan view as viewed from the side of the mounting surface 11. The ceramic layer 50 provided in the recess 30 is recessed toward the inside of the electronic component main body 10 and covers at least a part of the first baked electrode 21 on the recess 30 and at least a part of the second baked electrode 22 on the recess 30.

A plating electrode may be formed on the upper surface of the baked electrode by performing electroplating or electroless plating to the electronic component after firing.

Other Embodiments

The electronic component and the method for manufacturing the electronic component according to the present invention are not limited to the above-described embodiments, and various applications and modifications can be made within the scope of the present invention in terms of the structure of the electronic component and the manufacturing conditions thereof.

In the electronic components according to the first embodiment and the second embodiment of the present invention, although the recess is formed so as to overlap both of a part of the first baked electrode and a part of the second baked electrode, it may be formed so as to overlap at least one of at least a part of the first baked electrode and at least a part of the second baked electrode.

In the method for manufacturing the electronic component according to the first embodiment and the second embodiment of the present invention, although the resin paste is applied so as to cover both of a part of the first conductive paste layer and a part of the second conductive paste layer, the resin paste may be applied so as to cover at least one of at least a part of the first conductive paste layer and at least a part of the second conductive paste layer.

In the electronic component according to the second embodiment of the present invention, although the ceramic layer is provided so as to cover both of at least a part of the first baked electrode on the recess and at least a part of the second baked electrode on the recess, it may be provided so as to cover at least one of at least a part of the first baked electrode on the recess and at least a part of the second baked electrode on the recess.

In the method for manufacturing the electronic component according to the second embodiment of the present invention, although the ceramic paste is applied so as to cover both of a part of the first conductive paste layer and a part of the second conductive paste layer, the ceramic paste may be applied so as to cover at least one of a part of the first conductive paste layer and a part of the second conductive paste layer.

In the method for manufacturing the electronic component according to the present invention, the barrel-polishing may be performed after firing the layered composite.

REFERENCE SIGNS LIST 1, 1a, 1b, 2, 2a, 100 ELECTRONIC COMPONENT
10 ELECTRONIC COMPONENT MAIN BODY
11 MOUNTING SURFACE OF ELECTRONIC COMPONENT MAIN BODY
12 PASSIVE ELEMENT PORTION
21 FIRST BAKED ELECTRODE
22 SECOND BAKED ELECTRODE
30 RECESS
41 FIRST PLATING ELECTRODE
42 SECOND PLATING ELECTRODE
50 CERAMIC LAYER
110 UNFIRED ELECTRONIC COMPONENT MAIN BODY
111 MOUNTING SURFACE OF UNFIRED ELECTRONIC COMPONENT MAIN BODY
121 FIRST CONDUCTIVE PASTE LAYER
122 SECOND CONDUCTIVE PASTE LAYER
130 RESIN PASTE LAYER
150 CERAMIC PASTE LAYER
210, 220 UNFIRED LAYERED COMPOSITE
S, $S_0$ FIXING AREA
$W_1$ DISTANCE BETWEEN BAKED ELECTRODE EXPOSED SURFACES
$W_2$ DISTANCE BETWEEN BAKED ELECTRODES
θ ANGLE OF BAKED ELECTRODE

The invention claimed is:

1. An electronic component comprising:
an electronic component main body having opposed first and second outer surfaces;
first and second baked electrodes located on the first outer surface of the electronic component main body at locations spaced apart from one another along a first direction, a cross section of the electronic component main body and the first and second baked electrodes taken along the first direction including:
a flat mounting surface comprising a combination of first portions of the first outer surface of the electronic component main body and a first portion of at least one of the first and second baked electrodes;

a continuously curved recess extending inwardly towards a central portion of the electronic component main body, the continuously curved recess comprising a combination of a second portion of the first outer surface of the electronic component main body located between the first and second baked electrodes and a second portion of at least one of the first and second baked electrodes.

2. The electronic component according to claim 1, wherein the continuously curved recess overlaps at least part of both the first and second baked electrodes.

3. The electronic component according to claim 2, further comprising a ceramic layer located in the continuously curved recess and extending over at least a part of at least one of the first and second baked electrodes in an area where the recess extends.

4. The electronic component according to claim 3, further comprising:
   a first plating electrode provided on the first baked electrode; and
   a second plating electrode provided on the second baked electrode;
   wherein at least one of the first and second plating electrodes covers a part of the ceramic layer.

5. The electronic component according to claim 3, wherein:
   the continuously curved recess has an outer periphery; and
   a thickness of the ceramic layer is reduced toward the outer periphery of the continuously curved surface.

6. The electronic component according to claim 1, wherein:
   the continuously curved recess, as viewed along the cross section, has an inner portion and an outer periphery; and
   a thickness of the first and second baked electrodes, as viewed along the cross section, are thinner at the inner portion than at the outer periphery.

7. The electronic component according claim 1, wherein the electronic component main body includes a passive element portion including at least two internal electrode layers laminated together between a dielectric layer, the passive element portion being located above the continuously curved recess as viewed along the cross section when the first outer surface of the electronic component main body is facing downwardly.

8. The electronic component according to claim 1, wherein the continuously curved recess extends through a portion of each of the first and second baked electrodes and into the electronic component main body.

9. The electronic component of claim 1, further including a ceramic layer extends from the first baked electrode, over the second portion of the first outer surface of the electronic component main body and to the second baked electrode.

* * * * *